(12) United States Patent
Hotta

(10) Patent No.: US 12,106,426 B2
(45) Date of Patent: Oct. 1, 2024

(54) ADVERTISEMENT DISPLAY SYSTEM

(71) Applicant: DENTSU INC., Tokyo (JP)

(72) Inventor: Mihoko Hotta, Tokyo (JP)

(73) Assignee: DENTSU INC., Tokyo (JP)

( * ) Notice: Subject to any disclaimer, the term of this patent is extended or adjusted under 35 U.S.C. 154(b) by 106 days.

(21) Appl. No.: 18/000,360

(22) PCT Filed: Jun. 1, 2021

(86) PCT No.: PCT/JP2021/020852
§ 371 (c)(1),
(2) Date: Nov. 30, 2022

(87) PCT Pub. No.: WO2021/246403
PCT Pub. Date: Dec. 9, 2021

(65) Prior Publication Data
US 2023/0343020 A1    Oct. 26, 2023

(30) Foreign Application Priority Data

Jun. 1, 2020  (JP) .................................. 2020-095189

(51) Int. Cl.
*G06T 15/20* (2011.01)
*G06Q 30/0251* (2023.01)

(52) U.S. Cl.
CPC ......... *G06T 15/20* (2013.01); *G06Q 30/0261* (2013.01)

(58) Field of Classification Search
CPC .... G06T 15/20; G06Q 30/0261; G06Q 30/02; A63F 13/35; A63F 13/525; A63F 13/56;
(Continued)

(56) References Cited

U.S. PATENT DOCUMENTS 6,331,853 B1   12/2001 Miyashita
6,396,509 B1*  5/2002 Cheng .................... G06F 3/011
                                                    715/848
(Continued)

FOREIGN PATENT DOCUMENTS

JP    H11-161812 A    6/1999
JP    2003-248844 A   9/2003
(Continued)

OTHER PUBLICATIONS

International Search Report issued in PCT/JP2021/020852; mailed Jul. 6, 2021.
(Continued)

*Primary Examiner* — Phi Hoang
(74) *Attorney, Agent, or Firm* — Studebaker & Brackett PC

(57) ABSTRACT

An advertisement display system 1 acquires coordinates of the avatar and a size of the avatar in the virtual reality space and calculates a movement speed of the avatar by dividing a coordinate change amount per unit time of the avatar in the virtual reality space by a reference amount in accordance with the size of the avatar. In addition, the system 1 determines whether a point of view of the avatar in the virtual reality space is set to a first-person point of view or a third-person point of view. Furthermore, the system 1 performs control to differentiate, when an avatar is moving in the virtual reality space, a position where advertising is to be displayed in the virtual reality space with respect to the user operating the avatar in accordance with the movement speed of the avatar and the point of view of the avatar.

7 Claims, 5 Drawing Sheets

(a) MOVING AT LOW SPEED (FIRST-PERSON POINT OF VIEW):
FIRST ADVERTISING DISPLAY POSITION (PASS)

(b) MOVING AT HIGH SPEED (FIRST-PERSON POINT OF VIEW):
SECOND ADVERTISING DISPLAY POSITION (PASS)

(c) TELEPORTING (FIRST-PERSON POINT OF VIEW):
THIRD ADVERTISING DISPLAY POSITION (FIXED)

(58) Field of Classification Search
CPC .............. A63F 13/61; G09G 2354/00; G09G 2340/0464; G09G 3/003; G06F 3/011; G06F 3/14
See application file for complete search history.

(56) References Cited

U.S. PATENT DOCUMENTS

| | | | |
|---|---|---|---|
| 9,306,880 B1* | 4/2016 | Hyndman | .............. H04L 51/222 |
| 2003/0126035 A1 | 7/2003 | Kake et al. | |
| 2008/0215975 A1 | 9/2008 | Harrison et al. | |
| 2009/0091571 A1 | 4/2009 | Zalewski | |
| 2016/0003636 A1* | 1/2016 | Ng-Thow-Hing | ... G01C 21/365 |
| | | | 701/418 |
| 2017/0053452 A1 | 2/2017 | Arai | |
| 2017/0323306 A1* | 11/2017 | Kusumoto | ......... G06Q 30/0214 |
| 2018/0276687 A1* | 9/2018 | Hamilton, II | .......... G06Q 30/02 |
| 2018/0295389 A1 | 10/2018 | Kakurai | |
| 2020/0201048 A1 | 6/2020 | Nakata et al. | |
| 2020/0286114 A1* | 9/2020 | Gerami | .............. G06Q 30/0271 |
| 2020/0302510 A1* | 9/2020 | Chachek | ............ G06Q 30/0639 |
| 2021/0247946 A1* | 8/2021 | Klein | ................. G06Q 30/0242 |

FOREIGN PATENT DOCUMENTS

| | | |
|---|---|---|
| JP | 2009-093183 A | 4/2009 |
| JP | 2010-535362 A | 11/2010 |
| JP | 2012-205750 A | 10/2012 |
| JP | 5961736 B1 | 8/2016 |
| JP | 2017-208808 A | 11/2017 |
| JP | 2018-182428 A | 11/2018 |
| JP | 2019-039988 A | 3/2019 |
| WO | 2020/025976 A1 | 2/2020 |

OTHER PUBLICATIONS

"Decision to Grant a Patent" Office Action issued in JP 2020-095189; mailed by the Japanese Patent Office on Aug. 3, 2021.

* cited by examiner (a) FIRST ADVERTISING DISPLAY POSITION (PASS)

(b) SECOND ADVERTISING DISPLAY POSITION (PASS)

(c) THIRD ADVERTISING DISPLAY POSITION (FIXED)

(a) MOVING AT LOW SPEED (FIRST-PERSON POINT OF VIEW):
FIRST ADVERTISING DISPLAY POSITION (PASS)

(b) MOVING AT HIGH SPEED (FIRST-PERSON POINT OF VIEW):
SECOND ADVERTISING DISPLAY POSITION (PASS)

(c) TELEPORTING (FIRST-PERSON POINT OF VIEW):
THIRD ADVERTISING DISPLAY POSITION (FIXED)

(a) MOVING AT LOW SPEED (THIRD-PERSON POINT OF VIEW):
SECOND ADVERTISING DISPLAY POSITION (PASS)

(b) MOVING AT HIGH SPEED (THIRD-PERSON POINT OF VIEW):
SECOND ADVERTISING DISPLAY POSITION (PASS)

(c) TELEPORTING (THIRD-PERSON POINT OF VIEW):
THIRD ADVERTISING DISPLAY POSITION (FIXED)

ADVERTISEMENT DISPLAY SYSTEM

TECHNICAL FIELD

The present invention relates to an advertisement display system which displays advertising to a user in a virtual space.

BACKGROUND ART

Methods for displaying advertising to a user in a virtual space have been conventionally proposed. For example, a technique of causing a change in advertising displayed on an object other than an object which holds the gaze of a user has been proposed (for example, refer to Patent Literature 1).

CITATION LIST

Patent Literature

Patent Literature 1: Japanese Patent No. 5961736

SUMMARY OF INVENTION

Technical Problem

However, there have been no proposals whatsoever for displaying advertising with a focus on "movement" of an avatar in a virtual space. The "movement" of an avatar is a daily activity performed by everyone and, at the same time, an activity often performed alone. By focusing on the "movement" of an avatar, the number of contacts made by advertising increases due to an advertising presentation with another activity as a starting point and, consequently, it is expected that an advertising effect is to increase due to the mere-exposure effect (Zajonc's Law).

The present invention has been made in consideration of the problem described above and an object thereof is to provide an advertisement display system capable of displaying advertising at an appropriate position in a virtual reality space in accordance with a movement speed of an avatar or a point of view of the avatar in the virtual reality space.

Solution to Problem

An advertisement display system according to the present invention is an advertisement display system which displays advertising to a user in a virtual reality space, the advertisement display system including: a coordinate acquiring unit which acquires coordinates where an avatar operated by the user is positioned in the virtual reality space; a size acquiring unit which acquires a size of the avatar in the virtual reality space; a movement speed calculating unit which calculates a movement speed of the avatar by dividing a coordinate change amount per unit time of the avatar in the virtual reality space by a reference amount in accordance with the size of the avatar; a point-of-view determining unit which determines whether a point of view of the avatar in the virtual reality space is a first-person point of view which is a point of view of the avatar itself or a third-person point of view which is a point of view other than the point of view of the avatar itself; and an advertising display control unit which performs control to differentiate, when the avatar is moving in the virtual reality space, a position where advertising is to be displayed in the virtual reality space with respect to the user operating the avatar in accordance with the movement speed of the avatar and the point of view of the avatar.

According to this configuration, advertising can be displayed at an appropriate position in a virtual reality space in accordance with a movement speed of an avatar or a point of view of the avatar in the virtual reality space. For example, when the point of view of an avatar is a "first-person point of view" and the movement speed of the avatar is a "low speed", advertising is displayed on a ground in the virtual reality space so that the advertising is arranged parallel to the ground. In addition, when the point of view of an avatar is a "first-person point of view" and the movement speed of the avatar is a "high speed", advertising is displayed so that the advertising is arranged directly opposing the avatar in mid-air in the virtual reality space.

Furthermore, when the point of view of an avatar is a "third-person point of view" and the movement speed of the avatar is a "low speed", advertising is displayed so that the advertising is arranged directly opposing the avatar at a position near the avatar in mid-air in the virtual reality space. In addition, when the point of view of an avatar is a "third-person point of view" and the movement speed of the avatar is a "high speed", advertising is displayed so that the advertising is arranged directly opposing the avatar at a position far from the avatar in mid-air in the virtual reality space.

In this case, a movement speed of an avatar takes into consideration not only a coordinate change amount per unit time of the avatar but also the size of the avatar. For example, even when an avatar with a large size moves in a unit time by a same amount as a coordinate change amount considered to be a "high speed" for an avatar with a small size, a speed of the avatar with the large size may be a "low speed".

As described above, by displaying advertising at an appropriate position in the virtual reality space, the number of contacts made by a moving avatar with the advertising can be increased and an advertising effect in the virtual reality space can be enhanced.

In addition, in the advertisement display system according to the present invention, the advertising display control unit may calculate, when the avatar is moving in the virtual reality space, a movement destination of the avatar based on an operation input by the user and display advertising at the movement destination of the avatar.

According to this configuration, since advertising is displayed at a movement destination of an avatar in a virtual reality space, the number of contacts made by the moving avatar with the advertising can be increased and an advertising effect in the virtual reality space can be enhanced.

Furthermore, in the advertisement display system according to the present invention, the advertising display control unit may fix a position where the advertising is to be displayed when an operation to cause the avatar to teleport in the virtual reality space is performed.

According to this configuration, since a position where the advertising is to be displayed is fixed when an avatar teleports in the virtual reality space, by viewing the advertising during teleportation, a field of view of a user can be narrowed and virtual reality sickness which occurs due to disparity between motion information in the field of view and motion information perceived by the body can be suppressed.

In addition, in the advertisement display system according to the present invention, the advertising display control unit may display advertising at a position so as to keep a certain distance from the avatar when the avatar is moving in the virtual reality space.

According to this configuration, advertising is displayed at a position so as to keep a certain distance from an avatar when the avatar is moving in the virtual reality space. Since the advertising is displayed for a certain period of time or displayed constantly, an exposure time of the advertising can be increased.

Furthermore, in the advertisement display system according to the present invention, the advertising display control unit may display advertising so that the avatar passes by the advertising when the avatar is moving in the virtual reality space.

According to this configuration, advertising is displayed so that the avatar passes by the advertising when the avatar is moving in the virtual reality space. By causing an avatar to pass by advertising, awareness of a user about the advertising can be raised (attention of the user can be drawn toward the advertising).

In addition, in the advertisement display system according to the present invention, the advertising display control unit may display advertising when the avatar is moving in the virtual reality space such that the higher a movement speed of the avatar, the farther a position where the advertising is to be displayed.

According to this configuration, when the avatar is moving in the virtual reality space, the higher the movement speed of the avatar, the farther the position where the advertising is to be displayed. Since people tend to look into farther distances as movement speed increases, contact opportunities by a moving avatar with advertising can be increased.

An advertising display method according to the present invention is an advertising display method of displaying advertising to a user in a virtual reality space, the advertising display method including the steps of: acquiring coordinates where an avatar operated by the user is positioned in the virtual reality space; acquiring a size of the avatar in the virtual reality space; calculating a movement speed of the avatar by dividing a coordinate change amount per unit time of the avatar in the virtual reality space by a reference amount in accordance with the size of the avatar; determining whether a point of view of the avatar in the virtual reality space is a first-person point of view which is a point of view of the avatar itself or a third-person point of view which is a point of view other than the point of view of the avatar itself; and performing control to differentiate, when the avatar is moving in the virtual reality space, a position where advertising is to be displayed in the virtual reality space with respect to the user operating the avatar in accordance with the movement speed of the avatar and the point of view of the avatar.

Even according to this method, in a similar manner to the system described above, by displaying advertising at an appropriate position in the virtual reality space, the number of contacts made by a moving avatar with the advertising can be increased and an advertising effect in the virtual reality space can be enhanced.

Advantageous Effect of Invention

According to the present invention, advertising can be displayed at an appropriate position in a virtual reality space in accordance with a movement speed of an avatar or a point of view of the avatar in the virtual reality space.

DESCRIPTION OF EMBODIMENT

Hereinafter, an advertisement display system according to an embodiment of the present invention will be described with reference to the drawings. In the present embodiment, a case of an advertisement display system utilizing a virtual reality space will be exemplified. In the advertisement display system, advertising is to be displayed to a user in the virtual reality space.

Figure 1:
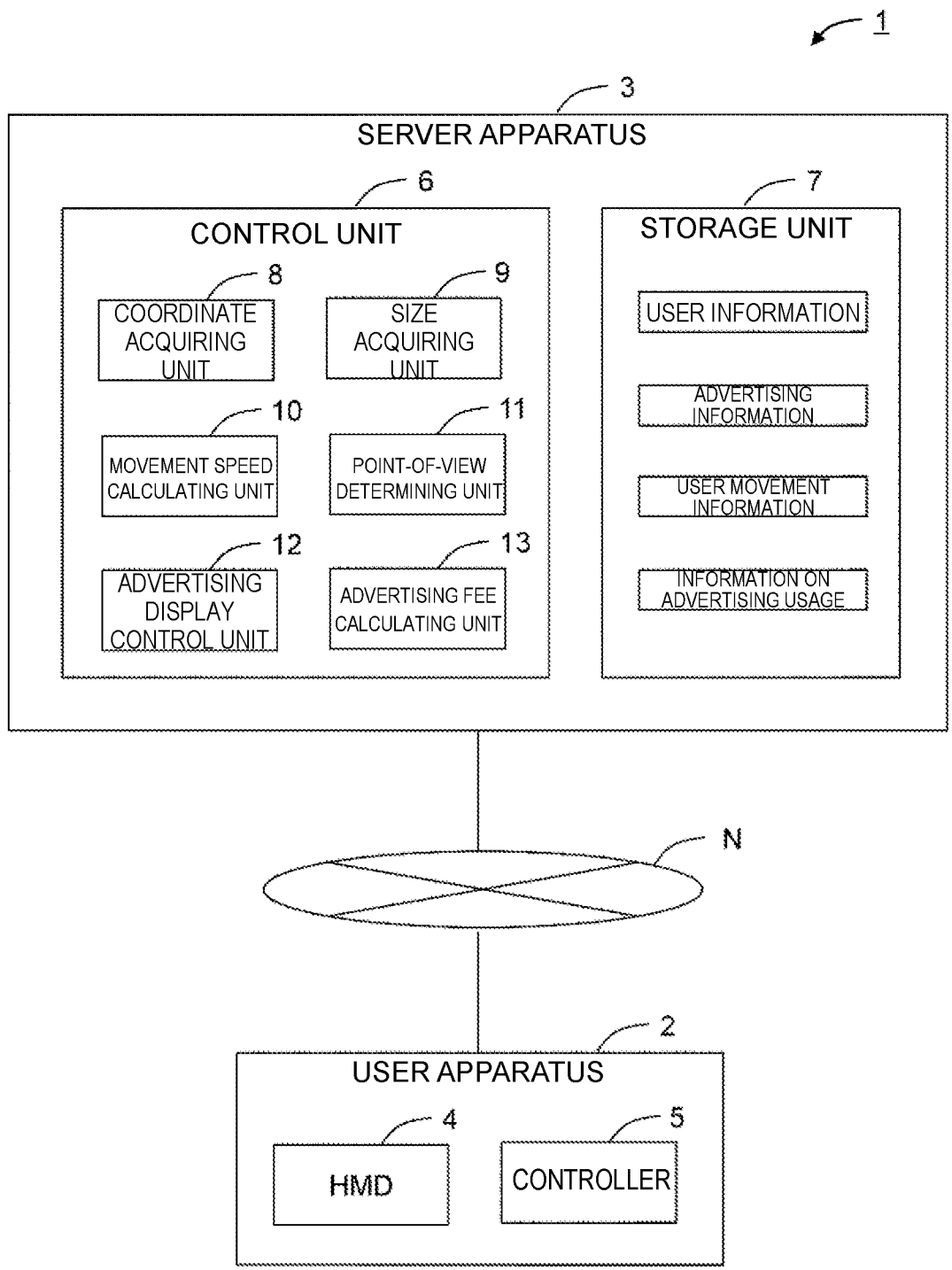
FIG. 1 is a block diagram showing a configuration of an advertisement display system according to an embodiment of the present invention.

A configuration of the advertisement display system according to the embodiment of the present invention will be described with reference to the drawings. FIG. 1 is a block diagram showing the advertisement display system according to the present embodiment. As shown in FIG. 1, an advertisement display system 1 is made up of a user apparatus 2 and a server apparatus 3 which are connected to each other by a network N.

The user apparatus 2 is an apparatus to be operated by a user and, for example, includes a head-mounted display 4 (HMD) and a controller 5. Note that the user apparatus 2 is not limited to an apparatus including the head-mounted display 4. For example, the user apparatus 2 may include a personal computer, a smartphone, or a tablet terminal.

The head-mounted display 4 is a display apparatus which is mounted to the head of the user and which covers a field of view of both eyes of the user. The user wearing the head-mounted display 4 can view video displayed on the head-mounted display 4. The head-mounted display 4 displays objects (electronic files) of any type including a still image, a moving image, a document, and a website. A display mode of the head-mounted display 4 is not particularly limited and a mode may be adopted in which an object is displayed at any position in a virtual space (virtual reality space) with depth or a mode may be adopted in which an object is displayed at any position on a virtual plane.

The controller 5 is an input interface which accepts operation input from the user. Although not illustrated, for example, the controller 5 includes at least one operation button and has various built-in sensors for detecting an orientation and a motion (acceleration, rotation, and the like) of the controller 5. Due to an operation input from the controller 5, the user can move an avatar in the virtual reality space. In addition, due to an operation input from the controller 5, the user can switch between points of view (first-person point of view/third-person point of view) of the avatar.

The server apparatus 3 includes a control unit 6 and a storage unit 7. For example, the control unit 6 is constituted of a processor or the like and the storage unit 7 is constituted of a large-capacity memory or the like.

The control unit 6 includes a coordinate acquiring unit 8, a size acquiring unit 9, a movement speed calculating unit 10, a point-of-view determining unit 11, an advertising display control unit 12, and an advertising fee calculating unit 13. The coordinate acquiring unit 8 acquires coordinates where an avatar operated by the user is positioned in the virtual reality space. For example, the coordinates are represented by, but not limited to, a combination of X-coordinate, Y-coordinate, and Z-coordinate. The size acquiring unit 9 acquires a size of the avatar in the virtual reality space. For example, the size of the avatar can be represented by coordinate values in a height direction (coordinate values that correspond to a height of the avatar).

The movement speed calculating unit 10 calculates a movement speed of the avatar by dividing a coordinate change amount per unit time of the avatar in the virtual reality space by a reference amount in accordance with the size of the avatar. When the calculated movement speed is lower than a predetermined threshold (for example, lower than "10"), the avatar is determined to be moving at "low speed", but when the calculated movement speed is equal to or higher than the predetermined threshold (for example, equal to or higher than "10"), the avatar is determined to be moving at "high speed".

In this case, the reference amount may be a value obtained by multiplying the size of the avatar by a predetermined coefficient or the size of the avatar itself (coefficient=1). Hereinafter, for convenience of explanation, a case where the reference amount is the size of the avatar (coefficient=1) will be explained.

For example, when the size of an avatar (a coordinate value in the height direction) is "10" and the avatar moves by a coordinate value of "100" per unit time (for example, per second), the movement speed of the avatar is a value obtained by dividing the coordinate change amount per unit time of "100" by the reference amount "10" or, in other words, "10". In this case, the avatar is moving at "high speed".

On the other hand, when the size of an avatar (a coordinate value in the height direction) is "100" and the avatar moves by a coordinate value of "100" per unit time (for example, per second), the movement speed of the avatar is a value obtained by dividing the coordinate change amount per unit time of "100" by the reference amount "100" or, in other words, "1". In this case, the avatar is moving at "low speed".

In this manner, even when the coordinate change amount per unit time of "100" is the same, movement speeds of avatars may differ depending on sizes of the avatars. In the example described above, even when the coordinate change amount per unit time of "100" is the same, a small avatar (the avatar with a size of "10") moves at "high speed" while a large avatar (the avatar with a size of "100") moves at "low speed".

Note that the movement speed calculating unit 10 may be included in the user apparatus 2. Methods of operating an avatar include a method according to an operation input by the controller 5 and a method of reflecting a movement of a user himself/herself. When reflecting the movement of the user himself/herself on an avatar, the movement of the user himself/herself is detected by the user apparatus 2 and then reflected on the avatar. In this case, a movement speed of the user (a movement speed of the user apparatus 2) is to be adopted as a coordinate change amount of the avatar.

The point-of-view determining unit 11 determines whether a point of view of an avatar in the virtual reality space is a "first-person point of view" which is a point of view of the avatar itself or a "third-person point of view" which is a point of view other than the point of view of the avatar itself. For example, the "third-person point of view" is, but not limited to, a point of view placed in a rear upper part of the avatar.

In addition, the point-of-view determining unit 11 may be included in the user apparatus 2. In such a case, for example, the user apparatus 2 may be provided with a switch or the like that accepts an operation input to switch between points of view of the avatar, and the point of view of the avatar may be determined based on switching of the switch.

The advertising display control unit 12 performs control to differentiate, when an avatar is moving in the virtual reality space, a position where advertising is to be displayed in the virtual reality space with respect to the user operating the avatar in accordance with the movement speed of the avatar and the point of view of the avatar. The advertising display control unit 12 calculates, when the avatar is moving in the virtual reality space, a movement destination of the avatar based on an operation input by the user and displays advertising at the movement destination of the avatar. A advertising display position will be described later.

The advertising fee calculating unit 13 checks usage of advertising (for example, circumstances of advertising presentation, the number of gazes on advertising, or duration of gazes on advertising) displayed in the virtual reality space and calculates an advertising fee based on the usage of the advertising.

The storage unit 7 stores user information (for example, user account information), advertising information (for example, an advertising use period, an upper-limit advertising fee, the total number of pieces of advertising, avatar attributes, and avoidances), user movement information (for example, a position, a movement speed, a movement direction, a point of view, and a size of an avatar), and information on advertising use (for example, circumstances of advertising presentation, the number of gazes on advertising, or duration of gazes on advertising).

Figure 2:
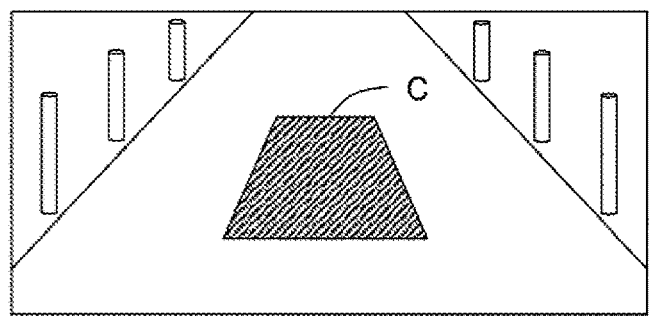
FIG. 2 is an explanatory diagram of advertising display positions (low-speed movement/high-speed movement/teleportation) according to the embodiment of the present invention.
Figure 2:
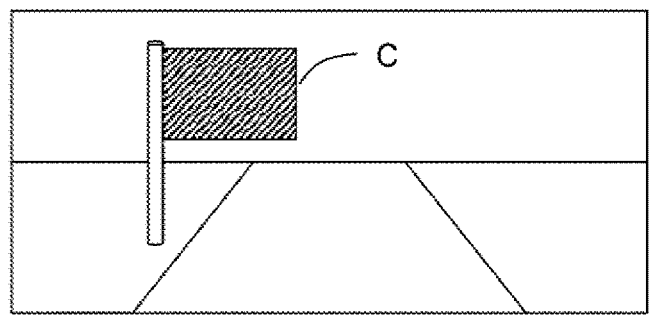
Figure 2:
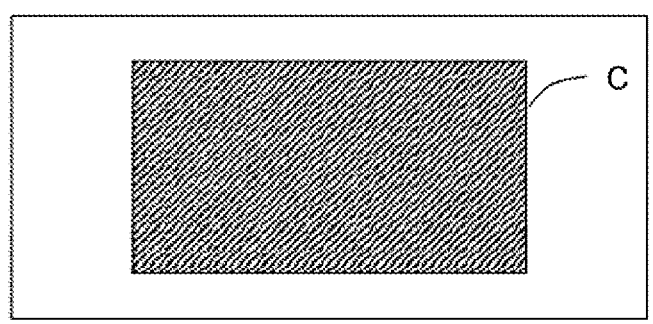
Figure 3:
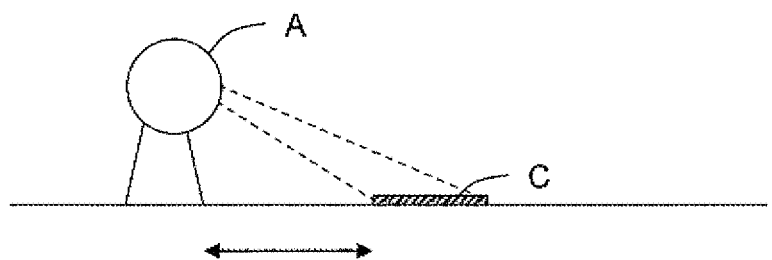
FIG. 3 is an explanatory diagram of advertising display positions (low-speed movement/high-speed movement/teleportation) in a first-person point of view.
Figure 3:
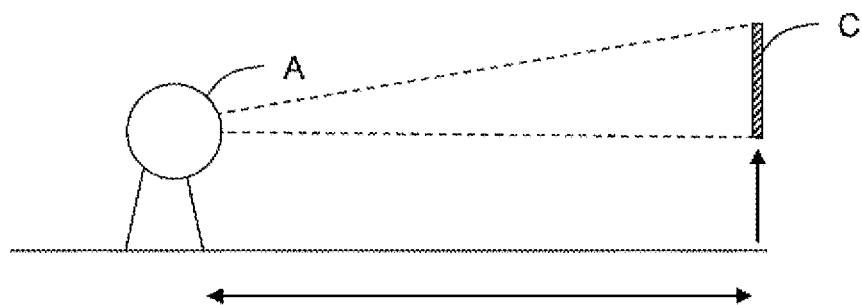
Figure 3:
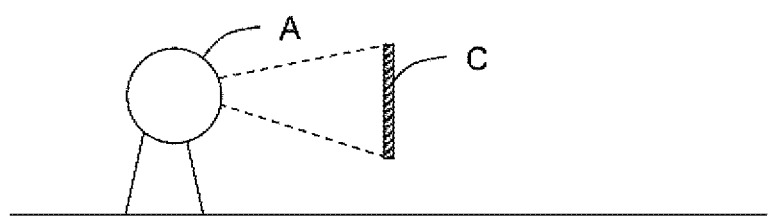
Figure 4:
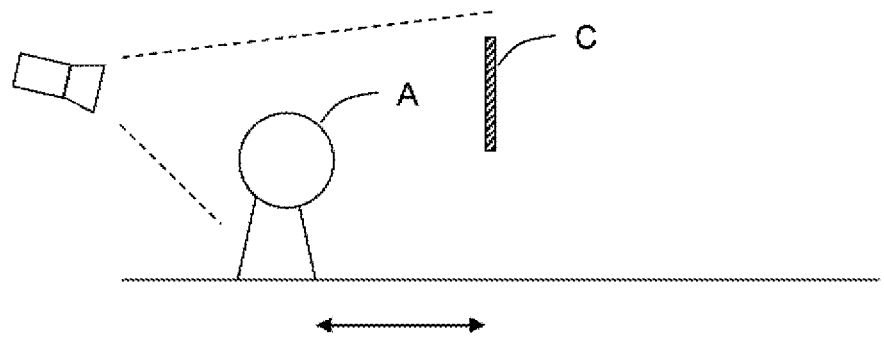
FIG. 4 is an explanatory diagram of advertising display positions (low-speed movement/high-speed movement/teleportation) in a third-person point of view.
Figure 4:
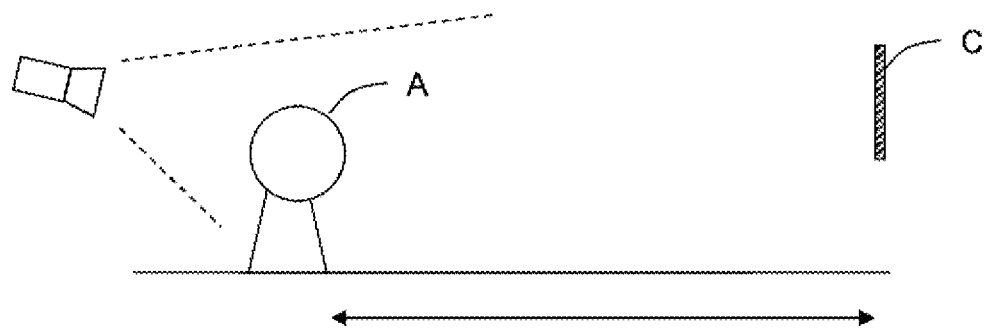
Figure 4:
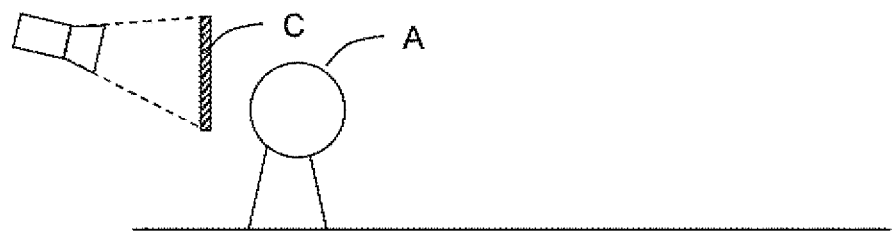

FIGS. 2 to 4 are explanatory diagrams showing examples of advertising display positions according to the present embodiment. As shown in FIG. 2, three advertising display positions are prepared in the present embodiment. In addition, as shown in FIGS. 3 and 4, advertising display positions differ depending on a movement speed of an avatar and a point of view of the avatar.

FIG. 2(*a*) is a diagram showing a first advertising display position. As shown in FIG. 2(*a*), at the first advertising display position, advertising C is displayed on a ground at a movement destination of an avatar so that the advertising C is arranged parallel to the ground. As shown in FIG. 3(*a*), this advertising display position is used when an avatar A with a "first-person point of view" is moving at "low speed". In this case, the advertising display control unit 12 displays the advertising C so that the avatar A passes by the advertising C when the avatar A is moving in the virtual reality space. In addition, when the avatar A is moving in the virtual reality space, the advertising display control unit 12 displays the advertising C such that the higher the movement speed of the avatar A, the farther the position where the advertising C is to be displayed from the avatar A. Alternatively, the advertising display control unit 12 may display the advertising C at a position so as to keep a certain distance from the avatar A when the avatar A is moving in the virtual reality space.

FIG. 2(*b*) is a diagram showing a second advertising display position. As shown in FIG. 2(*b*), at the second advertising display position, the advertising C is displayed so that the advertising C is arranged directly opposing an avatar in mid-air at the movement destination of the avatar. As shown in FIGS. 3(*b*), 4(*a*), and 4(*b*), this advertising display position is used when the avatar A with a "first-person point of view" is moving at "high speed" and when the avatar A with a "third-person point of view" is moving at "low speed" or "high speed". In this case, the advertising display control unit 12 displays the advertising C so that the avatar A passes by the advertising C when the avatar A is moving in the virtual reality space. In addition, when the avatar A is moving in the virtual reality space, the advertising display control unit 12 displays the advertising C such that the higher the movement speed of the avatar A, the farther the position where the advertising C is to be displayed from the avatar A. Alternatively, the advertising display control unit 12 may display the advertising C at a position so as to keep a certain distance from the avatar A when the avatar A is moving in the virtual reality space.

FIG. 2(*c*) is a diagram showing a third advertising display position. As shown in FIG. 2(*c*), at the third advertising display position, the advertising C is displayed at the center of a screen. As shown in FIGS. 3(*c*) and 4(*c*), this advertising display position is used when an avatar A teleports. In this case, the advertising display control unit 12 fixes a position where the advertising C is to be displayed when the avatar A is teleporting.

Operations of the advertisement display system 1 configured as described above will be described with reference to the sequence diagram shown in FIG. 5.

Figure 5:
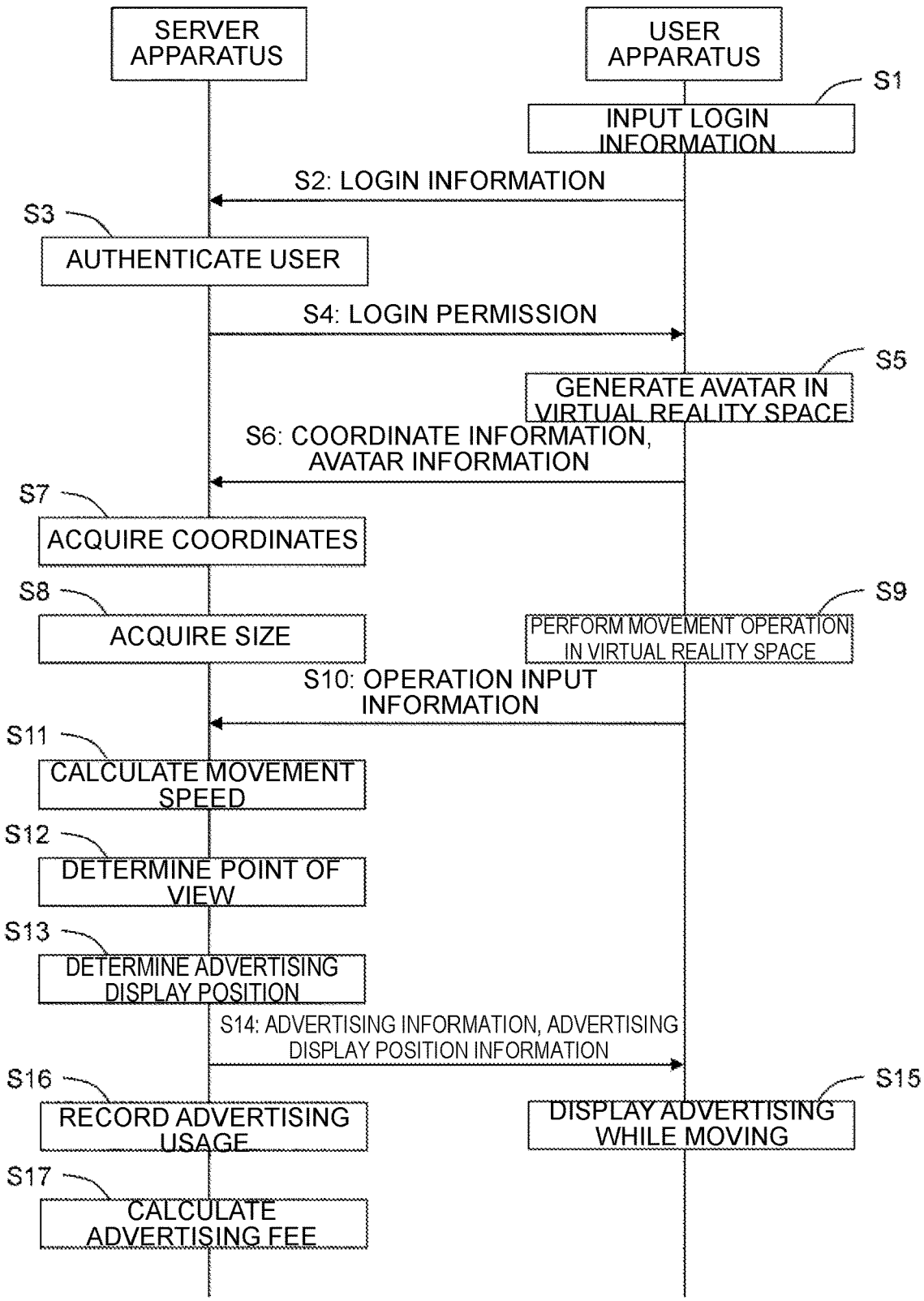
FIG. 5 is a sequence diagram for explaining an operation of the advertisement display system according to the embodiment of the present invention.

As shown in FIG. 5, when using the advertisement display system 1 according to the present embodiment, first, when login information is input on the user apparatus 2 (S1), the input login information is transmitted from the user apparatus 2 to the server apparatus 3 (S2), and processing of user authentication is performed by the server apparatus 3 (S3). When the user authentication is successful, login permission is sent from the server apparatus 3 to the user apparatus 2 (S4).

Next, when a user having obtained the login permission operates the user apparatus 2 and generates an avatar in a virtual reality space (S5), information on coordinates of the avatar and a size of the avatar operated by the user is sent from the user apparatus 2 to the server apparatus 3 (S6). Accordingly, the server apparatus 3 acquires coordinates where the avatar operated by the user is positioned in the virtual reality space (S7) and, at the same time, acquires a size of the avatar in the virtual reality space (S8).

When the user performs a movement operation of the avatar in the virtual reality space (S9), information on operation input from the user is sent from the user apparatus 2 to the server apparatus 3 (S10), and the server apparatus 3 calculates a movement speed of the avatar by dividing a coordinate change amount per unit time of the avatar in the virtual reality space by a reference amount in accordance with the size of the avatar (S11). In addition, the server apparatus 3 determines whether a point of view of the avatar in the virtual reality space is set to a first-person point of view which is a point of view of the avatar itself or to a third-person point of view which is a point of view other than the point of view of the avatar itself (S12).

Furthermore, as shown in FIGS. 2 to 4, the server apparatus 3 determines, when an avatar is moving in the virtual reality space, a position where advertising is to be displayed in the virtual reality space with respect to the user operating the avatar in accordance with the movement speed of the avatar and the point of view of the avatar (S13). As a result, information on the advertising and the advertising display position is sent from the server apparatus 3 to the user apparatus 2 (S14) and the advertising is displayed to the user in a virtual space (S15). In the server apparatus 3, usage of advertising (for example, circumstances of advertising presentation, the number of gazes on advertising, or duration of gazes on advertising) displayed in the virtual reality space is recorded (S16) and an advertising fee is calculated based on the usage of the advertising (S17).

With the advertisement display system 1 according to the present embodiment described above, advertising can be displayed at an appropriate position in a virtual reality space in accordance with a movement speed of an avatar or a point of view of the avatar in the virtual reality space. For example, when the point of view of an avatar is a "first-person point of view" and the movement speed of the avatar is a "low speed", advertising is displayed on a ground in the virtual reality space so that the advertising is arranged parallel to the ground. In addition, when the point of view of an avatar is a "first-person point of view" and the movement speed of the avatar is a "high speed", advertising is displayed so that the advertising is arranged directly opposing the avatar in mid-air in the virtual reality space.

Furthermore, when the point of view of an avatar is a "third-person point of view" and the movement speed of the avatar is a "low speed", advertising is displayed so that the advertising is arranged directly opposing the avatar at a position near the avatar in mid-air in the virtual reality space. In addition, when the point of view of an avatar is a "third-person point of view" and the movement speed of the avatar is a "high speed", advertising is displayed so that the advertising is arranged directly opposing the avatar at a position far from the avatar in mid-air in the virtual reality space.

In this case, the movement speed of the avatar takes not only a coordinate change amount per unit time of the avatar but also the size of the avatar into consideration. For example, even when an avatar with a large size moves in a unit time by a same amount as a coordinate change amount considered to be a "high speed" for an avatar with a small size, a speed of the avatar with the large size may be a "low speed".

As described above, by displaying advertising at an appropriate position in the virtual reality space, the number of contacts made by a moving avatar with the advertising can be increased and an advertising effect in the virtual reality space can be enhanced.

In addition, in the present embodiment, since advertising is displayed at a movement destination of an avatar in the virtual reality space, the number of contacts made by the moving avatar with the advertising can be increased and an advertising effect in the virtual reality space can be enhanced.

Furthermore, in the present embodiment, since a position where the advertising is to be displayed is fixed when an avatar teleports in the virtual reality space, by viewing the advertising during teleportation, a field of view of a user can be narrowed and virtual reality sickness which occurs due to disparity between motion information in the field of view and motion information perceived by the body can be suppressed.

In addition, in the present embodiment, advertising is displayed at a position so as to keep a certain distance from an avatar when the avatar is moving in the virtual reality space. Since the advertising is displayed for a certain period of time or displayed constantly, an exposure time of the advertising can be increased.

Furthermore, in the present embodiment, advertising is displayed so that the avatar passes by the advertising when the avatar is moving in the virtual reality space. By causing an avatar to pass by advertising, awareness of a user about the advertising can be raised (attention of the user can be drawn toward the advertising).

In addition, in the present embodiment, when the avatar is moving in the virtual reality space, the higher the movement speed of the avatar, the farther the position where the advertising is to be displayed. Since people tend to look into farther distances as movement speed increases, contact opportunities by a moving avatar with advertising can be increased.

While an embodiment of the present invention has been described by way of example, it is to be understood that the scope of the present invention is not limited to the embodiment and that the invention can be changed or modified in accordance with the intended use within the scope of claims.

INDUSTRIAL APPLICABILITY

As described above, the advertisement display system according to the present invention has an advantageous effect of enabling advertising to be displayed at an appropriate position in a virtual reality space and is usefully applied to various systems utilizing a virtual reality space.

REFERENCE SIGNS LIST

1 Advertisement display system
2 User apparatus
3 Server apparatus
4 Head-mounted display
5 Controller
6 Control unit
7 Storage unit
8 Coordinate acquiring unit
9 Size acquiring unit
10 Movement speed calculating unit
11 Point-of-view determining unit
12 Advertising display control unit
13 Advertising fee calculating unit
N Network
C Advertising
A Avatar

The invention claimed is:

1. An advertisement display system which displays advertising to a user in a virtual reality space, the advertisement display system comprising:
a processor configured to:
acquire coordinates where an avatar operated by the user is positioned in the virtual reality space;
acquire a size of the avatar in the virtual reality space;
calculate a movement speed of the avatar by dividing a coordinate change amount per unit time of the avatar in the virtual reality space by a reference amount in accordance with the size of the avatar;
determine whether a point of view of the avatar in the virtual reality space is a first-person point of view which is a point of view of the avatar itself or a third-person point of view which is a point of view other than the point of view of the avatar itself; and
perform control to differentiate, when the avatar is moving in the virtual reality space, a position where advertising is to be displayed in the virtual reality space with respect to the user operating the avatar in accordance with the movement speed of the avatar and the point of view of the avatar.

2. The advertisement display system according to claim 1, wherein the processor is configured to calculate, when the avatar is moving in the virtual reality space, a movement destination of the avatar based on an operation input by the user and displays advertising at the movement destination of the avatar.

3. The advertisement display system according to claim 1, wherein the processor is configured to fix a position where the advertising is to be displayed when an operation to cause the avatar to teleport in the virtual reality space is performed.

4. The advertisement display system according to claim 1, wherein the processor is configured to display advertising at a position so as to keep a certain distance from the avatar when the avatar is moving in the virtual reality space.

5. The advertisement display system according to claim 1, wherein the processor is configured to display advertising so that the avatar passes by the advertising when the avatar is moving in the virtual reality space.

6. The advertisement display system according to claim 1, wherein the processor is configured to display advertising when the avatar is moving in the virtual reality space such that the higher a movement speed of the avatar, the farther a position where the advertising is to be displayed.

7. An advertising display method of displaying advertising to a user in a virtual reality space, the advertising display method comprising the steps of:
acquiring coordinates where an avatar operated by the user is positioned in the virtual reality space;
acquiring a size of the avatar in the virtual reality space;
calculating a movement speed of the avatar by dividing a coordinate change amount per unit time of the avatar in the virtual reality space by a reference amount in accordance with the size of the avatar;
determining whether a point of view of the avatar in the virtual reality space is a first-person point of view which is a point of view of the avatar itself or a third-person point of view which is a point of view other than the point of view of the avatar itself; and
performing control to differentiate, when the avatar is moving in the virtual reality space, a position where advertising is to be displayed in the virtual reality space with respect to the user operating the avatar in accordance with the movement speed of the avatar and the point of view of the avatar.

* * * * *